US012627472B2

(12) United States Patent
Rangaraj

(10) Patent No.: US 12,627,472 B2
(45) Date of Patent: May 12, 2026

(54) DATA TRANSMISSION USING LATTICE-BASED ENCRYPTION

(71) Applicant: Capital One Services, LLC, McLean, VA (US)

(72) Inventor: Srinivasan Rangaraj, San Jose, CA (US)

(73) Assignee: Capital One Services, LLC, McLean, VA (US)

( * ) Notice: Subject to any disclaimer, the term of this patent is extended or adjusted under 35 U.S.C. 154(b) by 178 days.

(21) Appl. No.: 18/200,116

(22) Filed: May 22, 2023

(65) Prior Publication Data

US 2024/0396712 A1 Nov. 28, 2024

(51) Int. Cl.
H04L 9/08 (2006.01)
H04L 9/30 (2006.01)

(52) U.S. Cl.
CPC .......... H04L 9/0825 (2013.01); H04L 9/0861 (2013.01); H04L 9/3093 (2013.01)

(58) Field of Classification Search
CPC .... H04L 9/0825; H04L 9/0861; H04L 9/3093
See application file for complete search history.

(56) References Cited

U.S. PATENT DOCUMENTS

| | | | | | |
|---|---|---|---|---|---|
| 9,781,081 | B1 * | 10/2017 | Wasiq | .................... | H04L 63/166 |
| 11,153,363 | B1 * | 10/2021 | Speller, III | .......... | H04L 63/0807 |
| 11,218,301 | B1 * | 1/2022 | Shea | ..................... | H04L 9/0827 |
| 11,770,242 | B1 * | 9/2023 | Jung | ..................... | H04L 9/0825 |
| | | | | | 713/171 |
| 2020/0213335 | A1 * | 7/2020 | Marzorati | .......... | H04L 63/1466 |
| 2021/0226782 | A1 | 7/2021 | Florit et al. | | |
| 2021/0359868 | A1 | 11/2021 | Poeppelmann et al. | | |
| 2021/0367767 | A1 * | 11/2021 | Saravanan | ............ | H04L 9/0844 |
| 2021/0377049 | A1 | 12/2021 | Nix | | |
| 2022/0006835 | A1 * | 1/2022 | Gray | ..................... | H04L 9/0838 |
| 2022/0038278 | A1 * | 2/2022 | Gray | ..................... | H04L 9/0825 |
| 2022/0376928 | A1 * | 11/2022 | Wang | ........................ | H04L 9/14 |

(Continued)

FOREIGN PATENT DOCUMENTS

WO 2021007235 A1 1/2021

OTHER PUBLICATIONS

Banerjee, Ustav et al., "Efficient Post-Quantum TLS Handskaes using Identity-Based Key Exchange from Lattices", ICC 2020—2020 IEEE International Conference on Communications (ICC), Jul. 27, 2020, Publisher: IEEE.

(Continued)

*Primary Examiner* — Darshan I Dhruv

(74) *Attorney, Agent, or Firm* — Sterne, Kessler, Goldstein & Fox P.L.L.C.

(57) ABSTRACT

Disclosed herein are various embodiments for providing data transmission using lattice-based encryption. An embodiment operates by receiving a request from a client device and generating a lattice-based private key and a lattice-based public key in response to receiving the request. The lattice-based public key is transmit to the client device. An encrypted symmetric private key is received, wherein the encrypted symmetric private key is encrypted using the lattice-based public key. The encrypted symmetric private key is decrypted using the lattice-based private key. An encrypted payload data transmitted by the client device is received and decrypted using the symmetric private key.

18 Claims, 4 Drawing Sheets

200

(56)  References Cited

U.S. PATENT DOCUMENTS

| | | | |
|---|---|---|---|
| 2022/0399992 A1 * | 12/2022 | Christensen | H04L 9/3255 |
| 2023/0041783 A1 * | 2/2023 | Willis | H04L 9/0825 |
| 2023/0087297 A1 * | 3/2023 | Ghosh | H04L 9/0825 |
| | | | 713/168 |

OTHER PUBLICATIONS

Bos, Joppe W. et al., "Post-quantum key exchange for the TLS protocol from the ring learning with errors problem", 2015 IEEE Symposium on Security and Privacy, Jul. 20, 2015, Publisher: IEEE.

* cited by examiner

200

Receive a request
202

Generate a lattice-based private key and a lattice-based public key
204

Transmit the lattice-based public key
206

Receive an encrypted symmetric key
208

Decrypt the encrypted symmetric key
210

Receive encrypted payload data
212

Decrypt the payload data
214

300

Transmit a request
302

Receive a lattice-based public key
304

Generate symmetric private key
306

Encrypt the symmetric private key
308

Transmit the encrypted symmetric private key
310

Encrypt payload data
312

Transmit the payload data
314

DATA TRANSMISSION USING LATTICE-BASED ENCRYPTION

BACKGROUND

Entities often implement Rivest-Shamir-Adleman (RSA) based encryption for securing data transmissions. RSA includes a public key and a private key. The public key is used for encrypting data and the private key is used for decrypting the data. In RSA, the public key and private key are generated using prime numbers. With conventional computing, it was difficult to identify the prime numbers to break the encryption.

However, with the advent of quantum crypto machines, identifying the prime numbers involved in RSA encryption is becoming faster, easier, and more prevalent. As such, RSA encryption keys are vulnerable to quantum crypto attacks. Therefore, using RSA encryption may create security issues during transmission of sensitive data.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing data transmission using lattice-based encryption.

Entities often implement Rivest-Shamir-Adleman (RSA) based encryption for securing data transmissions. RSA includes a public key and a private key. The public key is used for encrypting data and the private key is used for decrypting the data. In RSA, the public key and private key are generated using prime numbers. With conventional computing, it was difficult to identify the prime numbers to break the encryption.

However, with the advent of quantum crypto machines, identifying the prime numbers involved in RSA encryption is becoming faster, easier, and more prevalent. As such, RSA encryption keys are vulnerable to quantum crypto attacks. Therefore, using RSA encryption may create security issues during transmission of sensitive data.

As described above, with the uptick in the availability and use of quantum crypto machines, RSA encryption keys have been vulnerable to quantum crypto attacks. This vulnerability creates security risks when transmitting secure data. For example, online-banking applications often use RSA encryption to encrypt sensitive data. This may include usernames, passwords, social security number, account numbers, etc.

However, given its vulnerabilities, using RSA encryption to encrypt sensitive data poses a risk for users using online-banking applications, or other applications that rely on secured transmissions.

Additionally, online-banking applications may use a transport layer security (TLS) protocol to transmit data between the application (which may be operating on a client device) and a server. The TLS protocol may involve exchanging security certificates between the client and server. It may be difficult and burdensome to change the infrastructure supporting TLS to add additional security. Moreover, changing the encryption process of the data stored in the cloud may be challenging. Embodiments described herein solve these problems by using lattice-based encryption and leveraging existing TLS communications.

Figure 1:
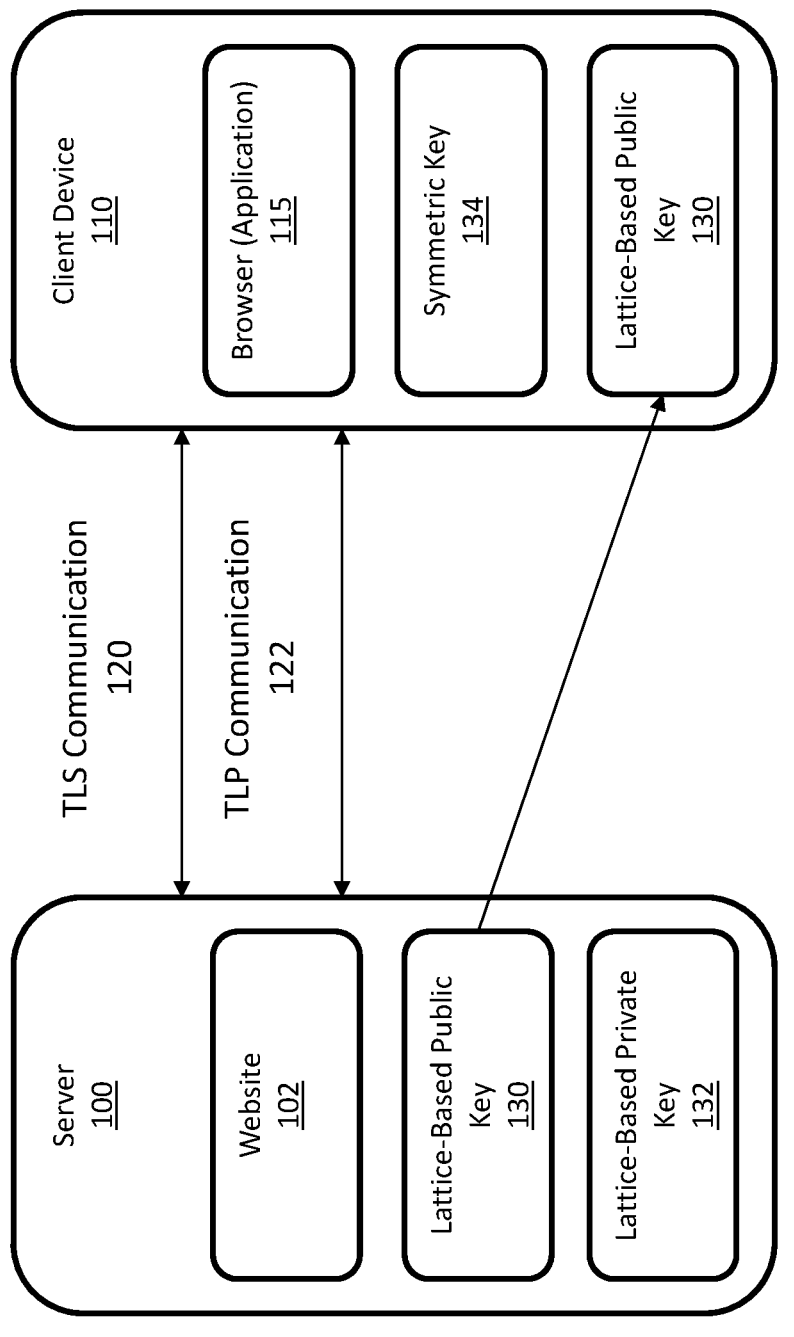
FIG. 1 is a block diagram illustrating a system for data transmission using lattice-based encryption, according to some example embodiments.

FIG. 1 is a block diagram illustrating a system for data transmission using lattice-based encryption, according to some example embodiments. In some embodiments, a server 100 may receive a request from a client device 110, such as a request for access to website 102 or a request for a particular transaction to be executed. In some embodiments, the server 100 may generate a lattice-based public key 130 and a lattice-based private key 132 in response to receiving the request. The server 100 may transmit the lattice-based public key 130 to the client device 110. The server 100, may receive a symmetric private key 134 from the client device 110 that has been encrypted using the lattice-based public key 130. The server 100 may then decrypt the encrypted symmetric private key 134 using the lattice-based private key 132 and may receive any additional payload data that may have been transmit with the symmetric key 134. The server 100 and client device 110 may then encrypt payload data of subsequent communications using the symmetric key 134 and/or the lattice-based public key 130.

In some embodiments, browser 115 may include an application operating or executing on client device 110, such an app. The app or browser 115 may transmit a request to access a web-domain 102. The application 115 may receive a lattice-based public key 130 from a server 100 associated with the web-domain 102. The application 115 may generate a symmetric private key 134 and encrypt the symmetric private key using the lattice-based public key 130. In some embodiments, the symmetric private key may be encrypted using the RSA encryption algorithm. The application 115 may transmit the encrypted symmetric key to the server 100. In the same, or a subsequent transmission, the application 115 may encrypt user or payload data using the symmetric private key 134 and transmit the encrypted payload data to the web-domain 134. The server 100 may then use the symmetric key 134 to decrypt the encrypted user or other payload data.

In some embodiments described herein, a lattice-based encryption system may be used to provide secured communications between a client device 110 (or application 115) and a server 100. The lattice-based encryption system may secure transmissions between two devices and prevent attacks from quantum crypto devices which may be able to crack existing RSA encrypted communications. Furthermore, the embodiments described herein may integrate the lattice-based encryption with TLS communication. This configuration further secures data transmission communication without changing TLS communication or the encryption process in the cloud.

FIG. 1 illustrates an example architecture of a system for providing data transmission using lattice-based encryption, including one or more servers 100 and one or more client devices 110. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some embodiments, server 100 may host one or more websites 102. In some embodiments, website 102 may be include any web-based application, or may include a back-end service that provides data and/or executes transactions on behalf of a front-end application 115. In some embodiments, client device 110 may access website 102 using a browser 115 or other app or application 115.

In some embodiments, browser 115 may include any application that is used to communicate with server 100, including but not limited to a web browser or an app. As a non-limiting example, a user may attempt to access website 102 using browser 115. Browser 115 may communicate and load data for the user on client device 110. In this regard, server 100 may receive a request from client device 110 via browser 115 to access website 102.

In some embodiments, the request may be transmitted by client device 110 using Hypertext Transfer Protocol Secure (HTTPS). In some embodiments, the request may be transmitted to server 100 using transportation layer security (TLS) communication 120. TLS communication 120 may use the TLS communications protocol and may be used in applications such as email, instant messaging, streaming media, and voice over IP. TLS communication 120 may also be used in communications over HTTPS.

TLS 120 is currently being used to perform RSA encrypted communications between different devices. The system described herein may leverage the existing TLS communication 120 pathways and infrastructure to provide additional security using over traditional RSA encryption. Using existing TLS 120 architecture is different from using the TLP communication 122 (as described in greater detail below) which may be structured differently for quantum computing and communications. Using the existing TLS 120 communication pathways allows for computing devices to use either RSA encryption or the lattice-based encryption described herein.

Client device 110 may be configured to transmit a request to server 100 to set up a communication using TLS communication 120 in response to browser 115 attempting to access website 102. In some embodiments, client device 110 may specify a particular port number associated with TLS communication 120 on server 100 when browser 115 is attempting to access website 102. Server 100 may be TLS-enabled.

In some embodiments, server 100 may generate a lattice-based private key 132 and lattice-based public key 130 in response to receiving the request. The lattice-based private key 132 and lattice-based public key 130 may be an asymmetric key-pair used for encryption (and decryption). Server 100 may transmit the lattice-based public key 130 to client device 110 in response to the received request using transportation layer protocol (TLP) communication 122. TLP communication 122 may be a post-quantum transportation layer protocol. TLP communication 122 may be a protocol or pathway that is used to transmit data that is encrypted using lattice-based encryption.

In some embodiments, client device 110 may generate a secret key or symmetric private key 134 and may encrypt the symmetric private key 134 using the lattice-based public key 130 received from server 100. Client device 110 may transmit the encrypted symmetric private key to server 100 using TLP communication 122.

Server 100 may receive the encrypted symmetric private key and may decrypt the encrypted symmetric private key using the lattice-based private key 132, which may provide server 100 with access to the symmetric private key 134 that was encrypted and any additional payload data that may have been received with or subsequent to decrypting and accessing the symmetric key 134. Sever 100 and client device 110 may then use this secret key or symmetric key 134 to encrypt and decrypt subsequent payloads or transmissions between each other over TLP communication 122.

In some embodiments, the communications between client device 110 and server 100 may be double encrypted. Double encryption may include, for example, client device 110 encrypting sensitive or payload data using symmetric key 134, and then encrypting the encrypted payload data using lattice-based public key 130. Client device 110 may then transmit the double-encrypted payload data to server 100. As noted above, the system described herein may use existing TLS communication pathways 120, which are configured to transmit RSA encrypted packages. The system herein may further increase the security of these RSA encrypted packages by adding lattice based encryption to the RSA encryption while leveraging existing TLS 102 communication pathways.

In some embodiments, browser 115 may load website 102 in response to server 100 successfully decrypting the encrypted symmetric private key 134 using the lattice-based private key 132.

In some embodiments, the user may input payload data on website 102 using browser 115. For example, the user may input authentication details (e.g., username and password) on website 102 using browser 115. Client device 110 may encrypt the payload data using the symmetric key 134 before transmitting the encrypted payload data to website 102 using TLS communication 120. The above described configuration allows for client device 110 and server 100 to communicate using TLS communications 120 and/or TLP communications 122 by sharing a lattice-based encryption key-pair (e.g., lattice-based public key 130 and lattice-based private key 132).

Server 100 may receive encrypted payload data from client device 110. Server 100 may decrypt the payload data using the symmetric private key 134. In some embodiments, server 100 may use the payload data to execute an action on website 102 or perform other data processing. For example, the payload data may include the authentication details or a request to perform a transaction, and server 100 may use the payload data to authenticate the user to access website 102 as an authenticated user and/or perform the transaction. Subsequent interactions between server 100 and client device 110 may be encrypted using the symmetric private key 134 for the duration of the connection. During a subsequent connection (after a disconnect), a new symmetric key 134 may be generated and provided to server 100 as described above.

Figure 2:
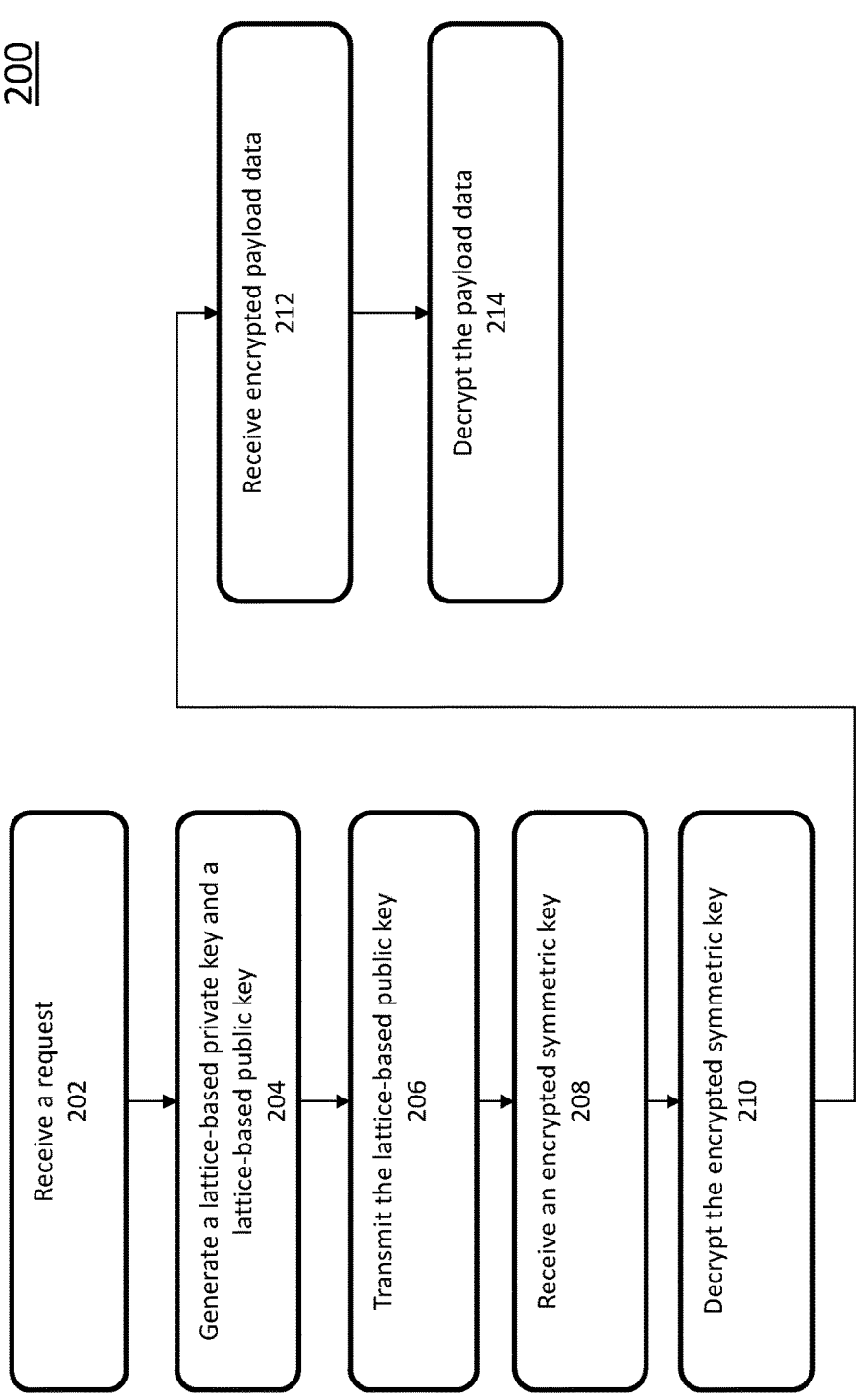
FIG. 2 is a flowchart illustrating a process for data transmission using lattice-based encryption from a server point-of-view, according to some embodiments.

FIG. 2 is a flowchart 200 illustrating a process for data transmission using lattice-based encryption from a server 100 point-of-view, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously or in a different order than shown in FIG. 2, as will be understood by a person of ordinary skill in the art.

In 202, a request is received. The request may include a hello transmission from a client device 110, such as a mobile phone or laptop. The hello transmission may include an unencrypted request for establishing secured communications and beginning a handshaking protocol between server 100 and client device 110. In some embodiments, the request may include a request for data, such as webpage data or other data from server 100. The request may be received over an existing TLS communication pathway 120.

In 204, a lattice-based private key and a lattice-based public key are generated. For example, server 110 may generate or retrieve a lattice-based public key 130 and a lattice-based private key 132. In some embodiments, the lattice may include a real coordinate space, which may include a finite set of points in space with various properties. One of these points of the lattice or coordinate space may be selected as the lattice point and used to generate the keys 130, 132. The size of the lattice (e.g., the number of points) may vary across different embodiments, but the greater the number of points, the more secure the corresponding keys 130, 132 will be—because it would require greater computational capacity and/or time to try and figure out the values of the keys 130 and 132. In some embodiments, the lattice based public key 130 may be used to encrypt an RSA encrypted packet or payload for double encryption.

In 206, the lattice-based public key is transmit. For example, server 100 may transmit the lattice-based public key 130 to client device 110 over an existing TLS communication pathway 120. In some embodiments, if there are multiple client devices 110, each client device 110 may receive the same lattice-based public key 130. In some embodiments, the lattice-based public key 130 and lattice-based private key 132 may be periodically re-generated and new keys 130, 132 may be used for new clients 110 connecting to server 100.

In 208, an encrypted symmetric key is received. For example, server 100 may receive a package, from client device 110, including symmetric key 134 that has been encrypted using the lattice-based public key 130.

In 210, the encrypted symmetric key is decrypted. For example, server 100 may decrypt the package using the lattice-based private key 132, to gain access to the symmetric key 134 and any other contents.

In 212, encrypted payload data is received. For example, server 100 may receive a subsequent encrypted package (subsequent to receiving the symmetric key 134) from client 110 over an existing TLS communication pathway 120.

In 214, the payload data is decrypted. For example, server 100 may decrypted this subsequent encrypted package using the symmetric key 134. In some embodiments, this package may be double encrypted and server may first decrypt the package using the lattice-based private key 132, and then decrypt those contents using the symmetric key 134.

Figure 3:
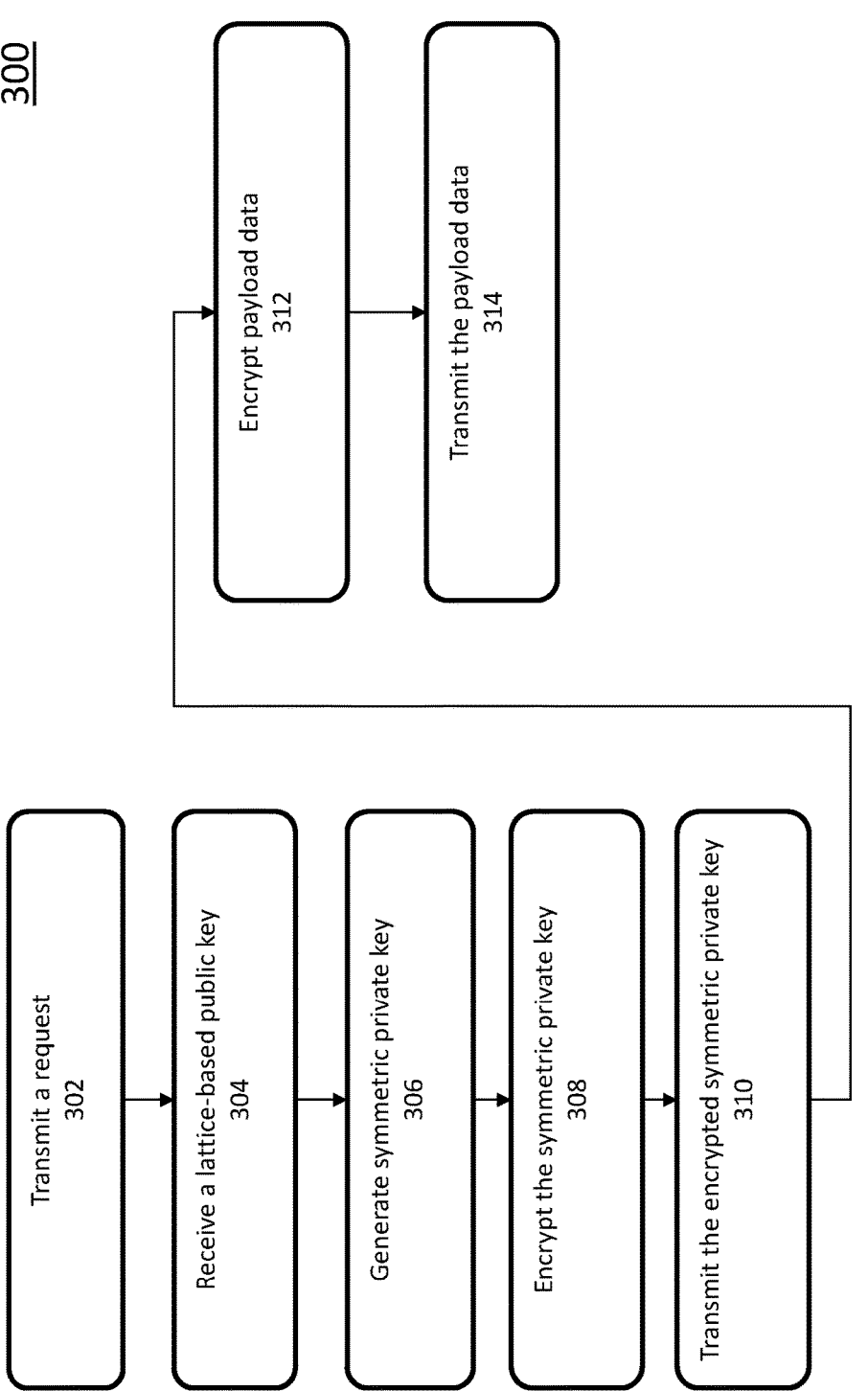
FIG. 3 is a flowchart illustrating a process for data transmission using lattice-based encryption from a client point-of-view, according to some embodiments.

FIG. 3 is a flowchart 300 illustrating a process for data transmission using lattice-based encryption from a client 110 point-of-view, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously or in a different order than shown in FIG. 3, as will be understood by a person of ordinary skill in the art.

In 302, a request is transmit. For example, client 110 may transmit a request to server 100. In some embodiments, this request may be transmit over the TLS communication channel 120.

In 304, a lattice-based public key is received. For example, client 110 may receive lattice-based public key 130 from server 100, which may be used by client 110 to encrypt one or more subsequent messages to server 100.

In 306, a symmetric private key is generated. For example, client 110 may generate, retrieve, or request a symmetric key 134. The symmetric key 134 may be generated using any available key generation algorithms.

In 308, the symmetric private key is encrypted. For example, client 110 may encrypt the symmetric key 134 using the lattice-based public key 130.

In 310, the encrypted symmetric private key is transmit. For example, client 110 may transmit the encrypted package including the symmetric key 134 over TLP communications 122.

In 312, payload data is encrypted. For example, client 110 may receive an acknowledgement or other encrypted package from server 100 indicating that the symmetric key 134 was received. Then, for example, client 110 may encrypt payload data, which may include any information to be transmit to server 100, using symmetric key 134. In some embodiments, client 110 may also encrypt the encrypted payload data using the lattice-based public key 130.

In some embodiments, client 110 may intentionally add some additional noise data to the payload data to provide additional security. This extra noise data may include any data in addition to the required to expected data to be received by server 100. Server 100 may be configured to ignore any irrelevant noise data when decrypting the package and accessing the payload data.

In 314, the encrypted payload data 314 is transmit. For example, client 110 may transmit the single or double encrypted data to server 100. In some embodiments, subsequent packages received by client 110, from server 100, may be decrypted by client 110 using the symmetric key 134.

Returning to FIG. 1, in some embodiments, present computing systems may only have access to TLS communication 120 using RSA encryption. However, the system of FIG. 1 may also be used to further strengthen existing RSA encrypted communications.

In conventional RSA communications, an RSA public key may be transmit to client device 110 after an initial communications or data request is received by server 100 (from client 110). Using the enhanced security of the lattice-based keys, server 100 may provide the lattice-based public key 130 in addition to providing the RSA public key to client 110.

Because existing HTTPS may be unaware of this additional lattice-based public key 130. The receiving browser or application 115, on client 110, may be configured to identify, receive, and or use the lattice-based public key 130. In some embodiments, this additional configuration may be performed with JAVASCRIPT functionality which is being executed by browser 115.

Then, for example, the JAVASCRIPT of the browser 115 may encrypt the symmetric key 134 using the lattice-based public key 130. In some embodiments, the browser 115 may then encrypt the lattice-based encrypted symmetric key 134 using the standard RSA public key, and transport the package over the existing TLS communications pathway 120. Subsequent communications between server 100 and client device 110 may be encrypted using the symmetric key 134 over standard TLS communications 120.

Figure 4:
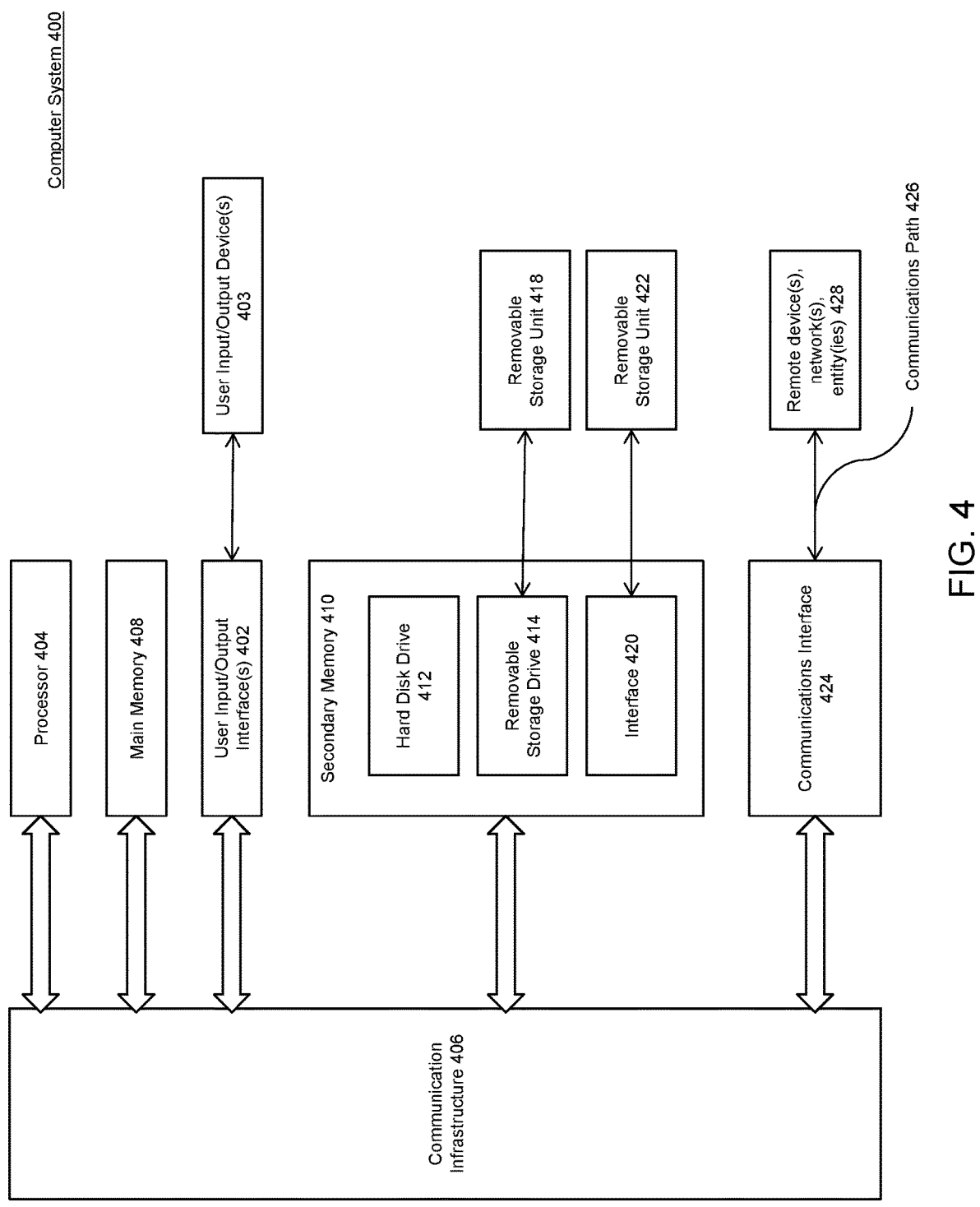
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface (s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for encrypting payload data, the method comprising:
receiving a request from a client device;
generating a lattice-based private key and a lattice-based public key in response to receiving the request;
transmitting the lattice-based public key to the client device using a transport layer security (TLS) communication pathway;
receiving an encrypted symmetric private key over the TLS communication pathway, wherein the encrypted symmetric private key is encrypted using the lattice-based public key;
wherein the lattice-based public key is transmitted using a first transportation layer security communication and the encrypted symmetric private key is received using a second transportation layer security communication;
decrypting the encrypted symmetric private key using the lattice-based private key;

receiving double-encrypted and noise-obfuscated payload data transmitted by the client device via the TLS communication pathway, wherein the payload data is double-encrypted using the symmetric private key and the lattice-based public key and noise-obfuscated by adding noise to the payload data; and
decrypting the double-encrypted and noise-obfuscated payload data using the symmetric private key and the lattice-based private key and by ignoring the noise.

2. The computer-implemented method of claim 1, wherein the request is transmitted using Hypertext Transfer Protocol Secure (HTTPS).

3. The computer-implemented method of claim 1, wherein the request is for accessing a web-domain from a browser executing on the client device.

4. The computer-implemented method of claim 1, wherein generating the public and private lattice-based keys is performed by using a lattice algorithm.

5. The computer-implemented method of claim 1, wherein generating the public and private lattice-based keys is performed by using a lattice algorithm and a Rivest-Shamir-Adleman (RSA) code-based algorithm.

6. The computer-implemented method of claim 1, wherein the encrypted payload is received from a transport layer security (TLS) end-point.

7. A system for encrypting payload data, the system comprising:
a memory; and
a processor coupled to the memory, wherein the processor is configured to perform operations comprising:
receiving a request from a client device;
generating a lattice-based private key and a lattice-based public key in response to receiving the request;
transmitting the lattice-based public key to the client device using a transport layer security (TLS) communication pathway;
receiving an encrypted symmetric private key over the TLS communication pathway, wherein the encrypted symmetric private key is encrypted using the lattice-based public key;
wherein the lattice-based public key is transmitted using a first transportation layer security communication and the encrypted symmetric private key is received using a second transportation layer security communication;
decrypting the encrypted symmetric private key using the lattice-based private key;
receiving double-encrypted and noise-obfuscated payload data transmitted by the client device via the TLS communication pathway, wherein the payload data is double-encrypted using the symmetric private key and the lattice-based public key and noise-obfuscated by adding noise to the payload data; and
decrypting the double-encrypted payload data using the symmetric private key and the lattice-based private key and by ignoring the noise.

8. The system of claim 7, wherein the request is transmitted using Hypertext Transfer Protocol Secure (HTTPS).

9. The system of claim 7, wherein the request is for accessing a web-domain from a browser executing on the client device.

10. The system of claim 7, wherein generating the public and private lattice-based keys is performed by using a lattice algorithm.

11. The system of claim 7, wherein generating the public and private lattice-based keys is performed by using a lattice algorithm and a Rivest-Shamir-Adleman (RSA) code-based algorithm.

12. The system of claim 7, wherein the encrypted payload is received from a transport layer security (TLS) end-point.

13. A non-transitory computer-readable medium having instructions stored thereon that, when executed by at least one computing device, cause the at least one computing device to perform operations comprising:

transmitting a request to access a web-domain;

receiving, via using a transport layer security (TLS) communication pathway, a lattice-based public key from a server associated with the web-domain;

generating a symmetric private key;

encrypting the symmetric private key using the lattice-based public key;

transmitting the encrypted symmetric key to the server over the TLS communication pathway;

wherein the lattice-based public key is received using a first transportation layer security communication and the encrypted symmetric private key is transmitted using a second transportation layer security communication;

double-encrypting and noise-obfuscating payload data using the symmetric private key and the lattice-based public key and by adding noise to the payload data; and transmitting the encrypted payload data to the web-domain via the TLS communication pathway.

14. The non-transitory computer-readable medium of claim 13, wherein the request is transmitted using Hypertext Transfer Protocol Secure (HTTPS).

15. The non-transitory computer-readable medium of claim 13, wherein the request is transmitted from a browser executing on a client device.

16. The non-transitory computer-readable medium of claim 13, wherein the server uses a lattice-based private key to decrypt the encrypted symmetric private key.

17. The non-transitory computer-readable medium of claim 13, wherein the encrypted payload is transmitted to a transport layer security (TLS) end-point.

18. The non-transitory computer-readable medium of claim 13, wherein the encrypted symmetric private key is encrypted using a Rivest-Shamir-Adleman (RSA) encryption.

* * * * *